United States Patent [19]
Lazzari et al.

[11] Patent Number: 5,465,302
[45] Date of Patent: Nov. 7, 1995

[54] METHOD FOR THE LOCATION OF A SPEAKER AND THE ACQUISITION OF A VOICE MESSAGE, AND RELATED SYSTEM

[75] Inventors: Gianni Lazzari, Mattarello; Maurizio Omologo, Rubano; Piergiorgio Svaizer, Mezzano di Primiero, all of Italy

[73] Assignee: Istituto Trentino Di Cultura, Trento, Italy

[21] Appl. No.: 137,995

[22] Filed: Oct. 19, 1993

[30] Foreign Application Priority Data

Oct. 23, 1992 [IT] Italy ................... TO92A0855

[51] Int. Cl.$^6$ .................................................. H04R 3/00
[52] U.S. Cl. .................................. 381/92; 381/66
[58] Field of Search ............... 381/92, 66; 379/410–411

[56] References Cited

U.S. PATENT DOCUMENTS

| | | | |
|---|---|---|---|
| 3,626,365 | 12/1971 | Press | 381/92 |
| 4,131,760 | 12/1978 | Christensen et al. | 381/66 |
| 4,354,059 | 10/1982 | Ishigaki et al. | 381/92 |
| 4,521,908 | 6/1985 | Miyaji et al. | 381/92 |

FOREIGN PATENT DOCUMENTS

| | | |
|---|---|---|
| 0386846 | 9/1990 | European Pat. Off. . |
| 4031089 | 4/1992 | Germany . |
| 2202942 | 10/1988 | United Kingdom . |
| 2251058 | 6/1992 | United Kingdom . |

OTHER PUBLICATIONS

"Some Analyses of Microphone Arrays for Speech Data Acquisition" by H. F. Silverman, IEEE Trans. on Acoustics, Speech and Signal Processing, vol. ASSP–35, No. 12, Dec. 1987.

"Computer–steered Microphone Arrays for Second Transduction in Large Rooms" by J. L. Flanagan, J. D. Johnston, R. Zahn, G. W. Elko, J. Acoust. Soc. Am., 78(5), Nov. 1985, pp. 1508–1518.

"Time Delay Estimation Using the LMS Adaptive Filter–Static Behaviour" by F. A. Reed, P. L. Feintuch, N. J. Bershad, IEEE Trans. on Acoustics, Speech and Signal Processing, vol. ASSP–29, No. 3, Jun. 1981.

"On Time Delay Estimation Involving Received Signals" by C. Y. Wuu, A. E. Pearson, IEEE Trans. on Acoustics, Speech, and Signal Processing, vol. ASSP–32, No. 4, Aug. 1984.

"An Algorithm for Determining Talker Location Using a Linear Microphone Array and Optimal Hyperbolic Fit" by H. F. Silverman, Proc. Speech and Natural Language Workshop DARPA, Jun. 1990, pp. 151–156.

"A Two-stage Algorithm for Determining Talker Location from Linear Microphone Array Data" by H. F. Silverman, S. E. Kirtman, Computer Speech and Language (1992) 6, pp. 129–152.

"An Approach for Dereverberation Using Multi–Microphone Sub–Band Envelope Estimation" by H. Wang and F. Itakura, Proc. IEEE Int. Conf. on Acoust. Speech Signal Processing, May 1991, pp. 953–956.

"The Generalized Correlation Method for Estimation of Time Delay" by C. H. Knapp, G. C. Carter, IEEE Trans. on Acoustics, Speech, and Signal Processing, vol. ASSP–24, No. 4, Aug. 1976.

"Digital Signal Processing" by A. V. Oppenheim, R. W. Schafer, Prentice Hall 1975.

"Optimum FIR Digital Filter Implementation for Decimation, Interpolation and Narrow Band Filtering" by R. E. Crochiere, L. R. Rabiner, IEEE Trans. on Acoustics, Speech, and Signal Processing, vol. ASSP–23, No. 5, pp. 444–456, Oct. 1975.

*Primary Examiner*—Stephen Brinich
*Attorney, Agent, or Firm*—Banner & Allegretti, Ltd.

[57] ABSTRACT

A system for the detection and location of acoustic signals which can be used, for example, for the acquisition of voice messages or the like, in environments in which noises, echoes and reverberations are present. The system employs an array of microphones and is based on the Fourier anti-transform calculus of only the information of phases of the normalised cross power spectrum of pairs of signals acquired from the microphones in the array. The system also enables an acoustic message cleared of the undesired components which are due to noises, echoes, etc to be reconstructed.

28 Claims, 4 Drawing Sheets

METHOD FOR THE LOCATION OF A SPEAKER AND THE ACQUISITION OF A VOICE MESSAGE, AND RELATED SYSTEM

FIELD OF THE INVENTION

The present invention relates in general to methods and systems for the acquisition and processing of acoustic signals, such as for example the methods and systems for detecting, locating and reconstructing acoustic signals. Typical examples of applications of systems of this type are voice acquisition and speaker location.

DESCRIPTION OF THE PRIOR ART

The acquisition of a voice message for the purposes of recognising, coding and verifying speakers, etc. is conventionally performed by the use of a fixed ("head-mounted") microphone in front of the speaker or held in the speaker's hand ("hand-held"). These devices have disadvantages associated with the low signal/noise ratio and with the dependence of the performance of the system on the manner in which it is used (distance between the mouth and the microphone, knocks and vibrations, etc.). The use of an array of microphones can overcome some of these problems and also permits easier interaction between the user and the system.

The technical literature over the past ten years illustrates various examples of the use of arrays of microphones for the acquisition of voice messages.

Reference can be made, for example, to the articles "Some Analyses of Microphone Arrays for Speech Data Acquisition" by H. F. Silverman, IEEE Trans. on Acoustics, Speech and Signal Processing, Vol. ASSP-35, no. 12, Dec. 1987 and "Computer-steered Microphone Arrays for Sound Transduction in Large Rooms" by J. L. Flanagan, J. D. Johnston, R. Zahn, G. W. Elko, J. Acoust. Soc. Am., 78(5), November, 1985, pp 1508–1518.

The acquisition of voice messages by means of an array of microphones has conventionally been achieved using techniques typical of the processing of underwater acoustic signals and radar signals, since the object is to detect the position of the acoustic source by means of more sensors distributed about the space and to utilise this knowledge to improve the ratio between useful signals and ambient noise.

At times, these techniques enable the information coming from the source to be extracted, without resorting to an express detection of its position (for example, beamforming techniques, LMS adaptive filtering: see, for example, the articles "Time Delay Estimation Using the LMS Adaptive Filter-Static Behaviour" by F. A. Reed, P. L. Feintuch, N. J. Bershad, IEEE Trans. on Acoustics, Speech and Signal Processing, Vol. ASSP-29, no. 3, June, 1981 and "On Time Delay Estimation Involving Received Signals" by C. Y. Wuu, A. E. Pearson, IEEE Trans. on Acoustics, Speech and Signals Processing, vol. ASSP-32, no.4, August, 1976).

The problem of locating an acoustic source by the use of an array of microphones is substantially due to the problem of measuring time delays between the signals acquired from different sensors. When the relative delays with which the sound wave has reached the different microphones are known, the curve of the incident wave front emitted by the acoustic source can be reconstructed and traced back to its centre, at which the source which produced it is assumed to be located.

The most widely used technique for estimating the relative delay between two signals is based on finding the maximum of the cross-correlation: see, for example, the articles "An Algorithm for Determining Talker Location using a Linear Microphone Array and Optimal Hyperbolic Fit" by H. F. Silverman, Proc. Speech and Natural Language Workshop DARPA, June, 1990, pp. 151–156, and "A Two-stage Algorithm for Determining Talker Location from Linear Microphone Array Data" by H. F. Silverman, S. E. Kirtman, Computer Speech and Language (1992) 6, pp. 129–152.

However, the efficacy of this method is largely influenced by the spectral content of the signals in question. For example, in the case of narrow-band signals (such as a whistle) or signals of high periodicity (such as a spoken sound), the estimation of the delay becomes critical or even impossible in the presence of echoes and reverberations: in these cases it is most efficient to attempt to extract the most useful information for assessing the delay and thus the phase delay directly.

The phase of detecting an acoustic event consists in preprocessing the signals acquired from the microphones, for determining the acoustically significant time segments on which a subsequent source-locating operation will be performed.

In the general case of sources of unknown and arbitrary acoustic events it is impossible to make assumptions a priori about the spectral characteristics of the signals emitted and the detection method cannot be based on particular signal models.

The characterisation in terms of power of the acoustic signal is the most direct and simplest which can be taken into consideration for performing the detection method: overcoming fixed or adjustable thresholds (dependent on the estimated noise level) can be sufficient in cases in which the signal/noise ratio is not too low.

As said above, some conventional methods of processing signals acquired by means of arrays of microphones enable an optimum signal to be reconstructed without the position of the acoustic source being estimated beforehand; this signal can be considered equivalent to the initial acoustic message, all the undesired acoustic components, attributable to secondary sources, being attenuated.

OBJECTS AND SUMMARY OF THE INVENTION

The object of the present invention is to provide a method and a system for the acquisition and processing of acoustic signals inherent in an acoustic event which enable the above disadvantages with respect to the prior art to be overcome or at least reduced.

In accordance with the present invention, this object is achieved by means of a method and a system having the characteristics indicated in the claims following the present description.

More specifically, the solution according to the invention has characteristics of strength, speed of calculation, accuracy and insensitivity to interference which are superior to the prior art systems. Solutions of this type can be used for the acquisition of a voice message or other types of acoustic event and for their location.

The present invention provides for the use of at least one array of microphones in a system enabling the acquisition of a general acoustic message in a noisy environment to be improved.

The present invention also provides for the possibility of processing information extracted from the signals acquired by means of the array of microphones, also enabling the speaker or the acoustic source which produced the message to be located.

Both the detection and the location of the message are performed, in an original manner, using the phase information present in the normalised cross-spectrum (estimated by means of a fast Fourier transform or FFT) relative to the signals acquired from a pair of microphones in the array.

The successive derivation of a new version of the message, improved from the point of view of the useful signal/ambient noise ratio relative to the single acquisitions attributed to each microphone in the array, is performed on the basis of the information obtained during the phase in which the message itself is detected and located: thus, still using simply a linear combination of the signals from the microphones in the array, suitably delayed, this method of reconstructing the signals is also distinguished by the originality with which the information relating to the disphasing between the signals acquired via the different microphones in the array is used.

What is to be understood by the term "array of microphones" in the present description and the following claims is a device composed of a plurality of microphones, preferably acting in all directions, which are aligned with respect to one another and at regular spacings from one another. Although it is not specifically mentioned in the following description, it is in all cases also possible to perform the invention with other types of microphones spatially distributed in a different manner: for example, in the manner described in the article "An approach of Dereverberation Using Multi-Microphone Sub-Band Envelope Estimation" by H. Wang and F. Itakura, Proc. IEEE Int. Conf. on Acoust. Speech Signal Processing, May, 1991, pp. 953–956.

It is self-evident that the expression "microphone" as used in the present context generally embraces all mechanical-electrical transducers which can convert an acoustic vibratory phenomenon (in which the ultra-sounds are comprised) into a processable electrical signal.

It will thus be appreciated that the microphones are connected to an analogue-to-digital conversion system operating at a sufficiently high sampling frequency (for example 24–48 kHz) synchronously between the various channels.

Specifically, in the present description reference is made to an embodiment using four microphones, although, theoretically, three would be sufficient for locating the source; however, a larger number of microphones can ensure that the system performs better.

The method described below refers in particular to the processing of acoustic messages consisting of a preliminary detection of the event itself, the accurate location of the position in which this event was generated, and, finally, of an optional reconstruction of a version of the original message cleared of the noise and reverberation components, etc. In this way it is possible to consider using the module for locating and/or detecting the acoustic event independently of the fact that the message then has to be converted into a version with optimum quality for the purposes of coding and voice recognition.

It can thus be assumed that the method and system according to the invention operate efficiently on sounds having their origin in a zone which is spatially restricted and the corresponding acoustic pressure wave of which has particular directionality features, unlike background noise which is assumed to be diffused almost uniformly in the environment.

Thus, the present description does not take into consideration cases in which speakers (or generic acoustic sources) emit simultaneous messages having comparable dynamics and for which the method described would be integrated (in a known manner) with methods for separating the sources.

In a particularly advantageous embodiment, the present invention provides for the use of a technique of estimating phase delays, such as the one described in the article "The Generalized Correlation Method for Estimation of Time Delay" by C. H. Knapp, G. C. Carter, IEEE Trans. on Acoustics, Speech and Signal Processing, Vol. ASSP-24, no. 4, August, 1976, never used previously in this area of acoustic analysis.

A technique of this type uses the Fourier antitransform of a version of the cross-spectrum of the two signals in which only the phase information is maintained. Thus, amplitude information, which is irrelevant for measuring delays when the signal/noise ratio is sufficiently high, is eliminated from the cross-spectrum of the signals.

The application to real signals acquired in a reverberating environment has demonstrated that the efficiency of this method is to a large extent independent of the type of source to be located (voice, whistling, explosions, various types of noises). It is furthermore possible to discriminate signals of a directional nature from other acoustic phenomena of a different type (background noise, reverberations, resonance), even if they are of the same intensity. The cost in terms of computation is comparable to that of the most efficient cross-correlation calculus and less than that of other delay estimators based on adaptive filtering.

The present invention thus proposes a novel detection method based on a function of coherence between pairs of signals exceeding a threshold, the same function also being used in the subsequent location phase. A function of this type represents an indication of reliability of the presence of an acoustic event, of a duration which is also very short and has obvious directionality features.

The invention further proposes a method which enables an optimum signal, such as linear combinations of the signals acquired by means of microphones and disphased according to the estimation of the position of the source (or the delays between the various pairs) supplied by the locating module, to be reconstructed.

The method and system according to the invention can be used mainly for the acquisition of a voice message in a noisy environment, without the need for the speaker to speak the message in front of the microphone. If the acquisition environment is noisy and reverberating, the message is cleared of some of the undesired components. The message acquired in this manner can then be supplied to a coding system (for teleconference or voice message applications) or to a voice recognition system.

DETAILED DESCRIPTION OF THE INVENTION

Further advantages and characteristics of the present invention will appear from the following description, given purely by way of non-limiting example and with reference to the appended drawings, in which:

FIG. 1 illustrates schematically an environment in which the system operates. The acoustic source (speaker, generic sound sources, etc. that is, the acoustic event which is to be detected) is indicated AS, whilst the array of microphones consists of four microphones $P_0$, $P_1$, $P_2$, $P_3$ shown aligned along an axis X.

The relative positions of the microphones and of the acoustic source are expressed in the form of co-ordinates in a cartesian plane x, y. The acoustic source AS emits wave fronts which are detected in different times and ways at the different points in the spatial region in which they are distributed, the microphones in the array $P_0$, $P_1$, $P_2$, $P_3$ thus allowing the functions of the system to develop at different points.

Figure 2:
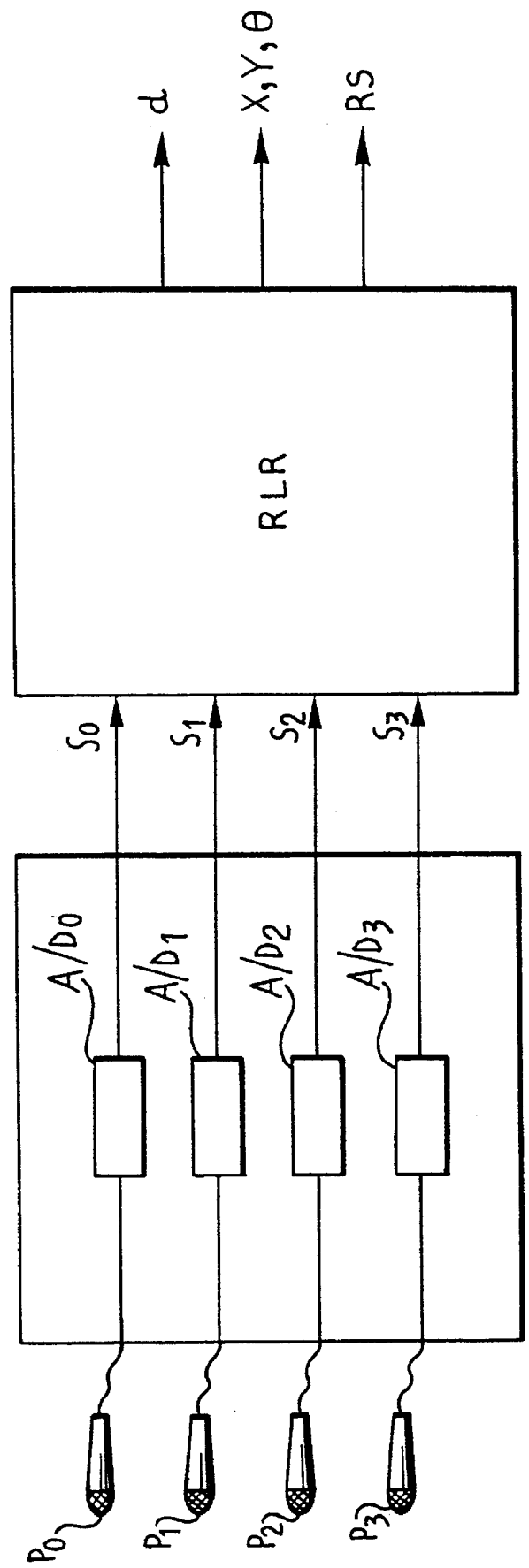
FIG. 2 is a schematic block diagram of the system according to the present invention.

FIG. 2 shows the general diagram of the system. The signals are acquired by the use of four microphones $P_0$, $P_1$, $P_2$, $P_3$, acting in all directions, which are supposed to be equally spaced relative to one another (for example, a 15 cm spacing between two adjacent microphones) and are connected to four analogue-to-digital converters $A/D_0$, $A/D_1$, $A/D_2$, $A/D_3$ operating at a given sampling frequency $F_c$, of, for example, 48 kHz. The four outputs of these acquisition modules, indicated $S_0$, $S_1$, $S_2$, $S_3$ ($S_i$ in which i=0, ..., 3), are connected to a processing module generally indicated RLR (detection of the events, location of the source and reconstruction of the signal).

Figure 3:
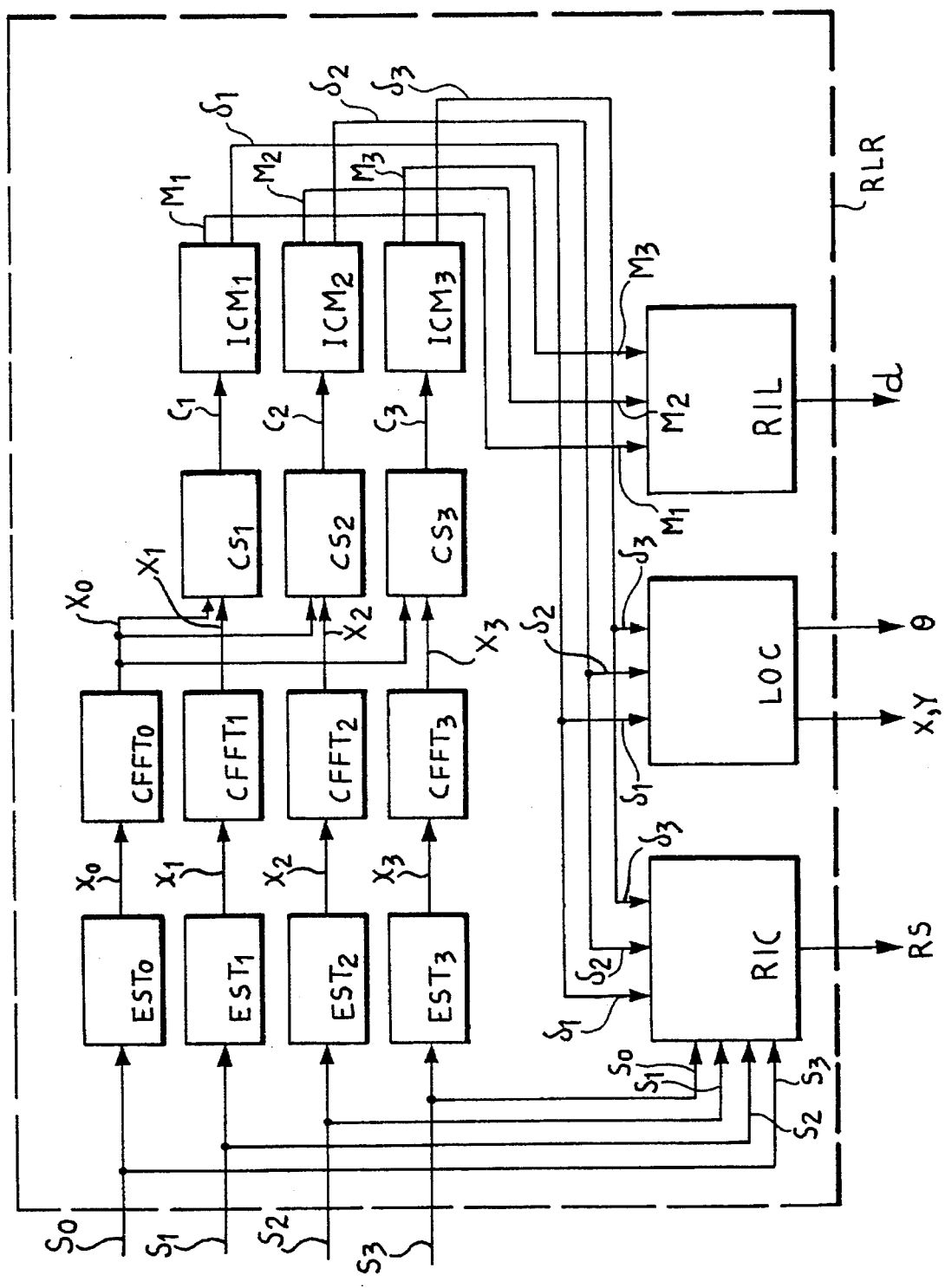
FIG. 3 is a schematic block diagram of part of the system according to the present invention.

FIG. 3 shows the operating block diagram of the module RLR. At the inlet, the module RLR receives all the signals $S_i$ (in which i=0, ..., 3); the outputs of this module consist of a pair of co-ordinates X and Y (if necessary with an angular co-ordinate $\Theta$ which identifies the direction of the source AS), of a detection index d and of a reconstructed signal RS.

In the following, the modules constituting the module RLR and the operations they perform to obtain the said outputs will be described.

In practice, the module RLR can be constituted by an electronic processing device such as a minicomputer or by a specialised processor specifically programmed for this purpose. The criteria for producing, programming and using computers and/or processors of this type are well known in the art and need not therefore be described herein.

The module RLR comprises a first series of modules $EST_0$, $EST_1$, $EST_2$, $EST_3$ ($EST_i$, where i=0, ..., 3) which convert the signals $S_i$ (from the microphones $P_0$, $P_1$, $P_2$, $P_3$), received respectively at the input, into numerical sampling frames and furthermore arrange the windows for the frames obtained. The output of the modules EST thus consists of the frames indicated $x_0$, $x_1$, $x_2$, $x_3$ respectively ($x_i$ where i=0, ..., 3).

A second series of modules, indicated $CFFT_0$, $CFFT_1$, $CFFT_2$, $CFFT_3$ ($CFFT_i$, where i=0, ..., 3), the inputs of which are connected to the respective outputs of the modules $EST_i$, perform the fast Fourier transform calculus (or FFT)—or optionally another integral transform—for all the frames. The outputs of the modules $CFFT_i$ in which i=0, ..., 3 are designated $X_0$, $X_1$, $X_2$, $X_3$ ($X_i$, where i=0, ..., 3) respectively.

A third series of modules, indicated $CS_1$, $CS_2$, $CS_3$, ($CS_i$, in which i=1, ..., 3), calculates the cross-spectra, or normalised cross (power) spectra estimated by the use of an FFT (Fast Fourier Transform), between pairs of frames. Each of the modules $CS_i$ in fact receives as input the outputs of two modules of the preceding series, that is, of the modules $CFFT_i$. In particular, each module $CS_i$ receives as input the output $X_i$ of the corresponding module $CFFT_i$ and then the output $X_0$ of the module $CFFT_0$.

In this way, the modules $CS_i$ calculate the normalised cross-spectrum of the pairs of frames $(X_0, X_1)$, $(X_0, X_2)$, $(X_0, X_3)$ extracted from the signals $S_0$, $S_1$, $S_2$, $S_3$. The modules $CS_i$ furthermore calculate the inverse FFTs of the normalised cross-spectra. The outputs of the modules $CS_i$ consist of the signals $C_1$, $C_2$, $C_a$ ($C_i$, where i=1, ..., 3) respectively.

A fourth series of modules, indicated $ICM_1$, $ICM_2$, $ICM_3$ ($ICM_i$ where i=1, ..., 3), interpolates the signals $C_1$, $C_2$, $C_3$, obtained in this manner, and searches for their time maxima. The outputs of the modules $ICM_i$ are provided by the pairs of signals $M_1$ and $\delta_1$, $M_2$ and $\delta_2$, $M_3$ and $\delta_3$.

A module RIL performs the detection function on the basis of the signals $M_1$, $M_2$, $M_3$. The output of the module RIL is the signal d.

A module LOC performs the location function, that is, determining the direction $\Theta$ from which the wave front arrives and calculating the co-ordinates (X, Y) of the source. The module LOC operates on the basis of the signals $\delta_1$, $\delta_2$, $\delta_3$ and emits the signal $\Theta$ and the pair of co-ordinates X, Y at the output.

A module RIC performs the reconstruction function, that is, constructing a new version of the acoustic message represented by the signal emitted at the output RS. The module RIC operates on the basis of the input signals $\delta_1$, $\delta_2$, $\delta_3$ and $S_0$, $S_1$, $S_2$, $S_3$.

The various modules constituting the system according to the present invention and the operations they perform will now be described in more detail module by module.

Modules $EST_i$

For each signal S, each module $EST_i$ extracts respective frames $x_i$ of a length $t_f$ ms, corresponding to N samples, with an analysing pitch of $t_a$ ms. Each frame is then weighted with a Blackman window defined in the method described in "Digital Signal Processing" by A. V. Oppenheim, R. W. Schafer, Prentice Hall 1975. The use of the Blackman window has proved more effective for the purposes of the present invention than the use of a conventional Hamming window.

Modules $CFFT_i$

The modules $CFFT_i$ receive as input the frames $x_i$ of N samples, extracted from the signals S and weighted as described above. The frames then undergo an FFT to produce a complex sequence $X_i$ of N components. One possible calculation of the FFT is described for example in the above-mentioned article by Oppenheim. The embodiment described is set up such that Fc=48 kHz, N= 1024 (and consequently $t_f$= 21.33) and $t_a$= $t_f/2$=10.66. It will be appreciated that the above values need not be interpreted in a strictly limitative sense. They are nevertheless indicative of the respective orders of magnitude in which parameters of this type are selected.

Modules $CS_i$

Figure 4:
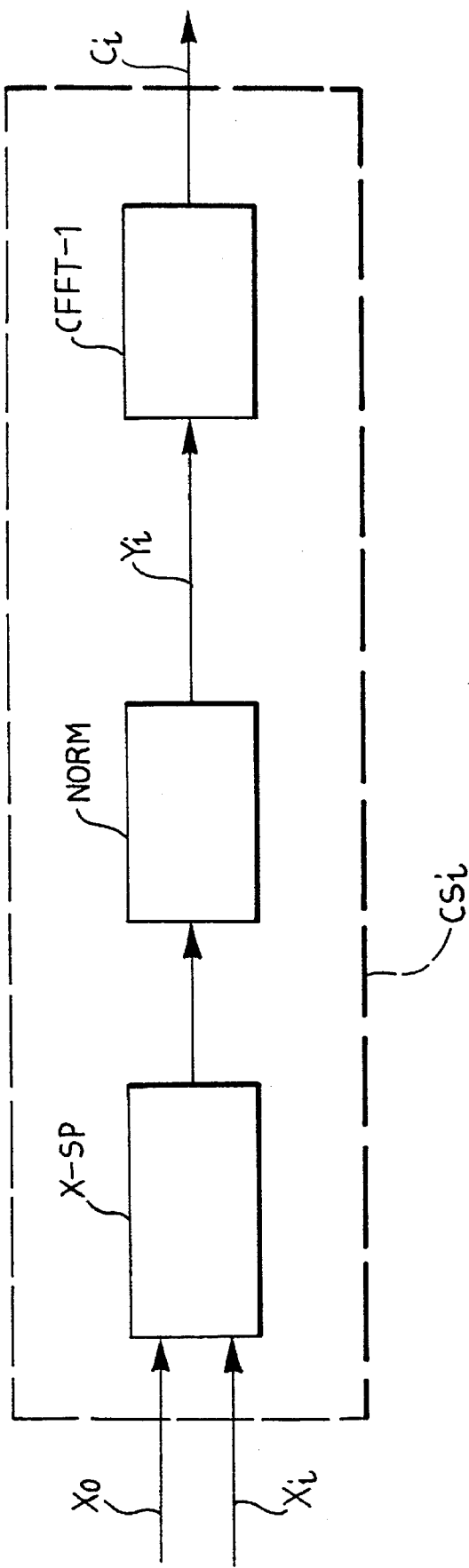
FIG. 4 is a schematic block diagram of a block of the part of the system illustrated in FIG. 3.

In practice all modules $CS_i$ comprise three submodules, shown in FIG. 4 for better understanding.

A first submodule X-SP calculates the cross-spectrum of a pair of complex sequences $X_0$, $X_i$. A second submodule NORM normalises the abovementioned cross-spectrum calculated by the submodule X-SP generating a complex vector $Y_i$ at the output. Finally, a third submodule $CFFT^{-1}$ performs an inverse FFT of the said vector $Y_i$.

These operations, described briefly above, will now be described in further detail, particularly as regards the mathematical aspect.

For each analysis moment t, for each pair of sequences $(X_0, X_1)$, $(X_0, x_2)$, $(X_0, X_3)$ the vector $\vec{P}_j$ of N components is calculated and defined as:

$$\vec{p}_j = FFT^{-1}[\vec{Y}_j]$$

when j= 1, 2, 3, where the l-th generic complex component of the vector $\vec{Y}_j$ is defined as:

$$Y'_j(l) = \left[ \frac{X_0(l) X_j^*(l)}{|X_0(l)| |X_j^*(l)|} \right]$$

which $\vec{X}_j^*$ indicates the conjugate complex vector of the vector $\vec{X}_j$.

The components $\rho_j(i)$ of the vector $\vec{\rho}_j$ express a measure of coherence between the original signal frames when the relative delay $\tau_i$ is equal to i sampling intervals. A positive delay $k/F_c$ corresponds to the k-th generic component of the first half of the vector (components from index 0 to index N/2−1); a negative delay (or a leader) equal to $(N-k)/F_c$ corresponds to the k-th generic component of the second half of the vector (components from index N/2 to index N−1).

In ideal conditions, in which the two signals are equal except for a scale factor and a delay $\tau_0$, equal to a whole number of sampling intervals, a sequence $\vec{p}_j$ consisting of a pulse centred on the component corresponding to the delay $\tau_0$ would be obtained. In practice, $\rho_j(i)$ can be interpreted as an index of coherence between the frame $X_0$ and the frame obtained by disphasing $X_j$ of a number of samples corresponding to the delay $\tau_i = i/F_c$, or, in the case of a fixed acoustic source, as an index of coherence between the signal $S_0$ and the signal $S_j$ disphased by $\tau_j$. The components of the vector $\vec{\rho}$ are normalised between 0 and 1. As defined above, the analysis performed on the frames every $t_a$ ms leads to the determination of three coherence functions $C_1(t, \tau)$, $C_2(t, \tau)$, $C_3(t, \tau)$ consisting at any moment $t = n \cdot t_a$ of the vectors $\vec{\rho}_1$, $\vec{\rho}_2$, $\vec{\rho}_3$, respectively.

Modules $ICM_i$

In order to render the abovementioned coherence information more detailed, each vector $\vec{\rho}_j$ is reprocessed in the modules ICM by means of an interpolation and filtering operation. In this way the estimation of the delay between two signals can be made more accurate.

In practice, as a result of the function $C_j(t, \tau)$ being applied to the vector $_j$ at any moment $t = n \cdot t_a$ of an operation (described, for example, in the article "Optimum FIR Digital Filter Implementation for Decimation, Interpolation and Narrow Band Filtering" by R. E. Crochiere, L. R. Rabiner, IEEE Trans. on Acoustics, Speech and Signal Processing, Vol, ASSP-23, no. 5, pp. 444–456, October, 1975), a new coherence function $C'_j(t, \tau')$ is obtained in which the discrete variable $\tau'$ has a larger resolution than the discrete variable $\tau$.

For each coherence function $C'_j(t, \tau')$ a search is then performed at any moment $t = n \cdot t_a$, for the maximum of the function itself, when the delay $\tau'$ is varied (in practice, the position of this maximum expresses the phase information present in the cross-spectra calculated above). The maximum of this function when $\tau'$ is varied is defined as $M_j(t)$ and when j=1,2,3:

$$M_j(t) = \max_{\tau'} C'_j(t, \tau')$$

and the delay $\tau'_{max}$ corresponding thereto is defined as $\delta_j(t)$.

Module RIL: Detection

The detection of the acoustic event is based at any moment t on the values $M_1(t)$, $M_2(t)$, $M_3(t)$. A detection index d(t) such as:

$$d(t) = \max[M_1(t), M_2(t), M_3(t)]$$

is derived from these functions.

Whenever this index exceeds an empirically predefined threshold $S_d$, for example in the present embodiment the set up is such that $S_d = 0.7$, an acoustic event is considered to be initiated. The event is considered to be terminated when the said index returns below this threshold.

Module LOC: Location

Figure 1:
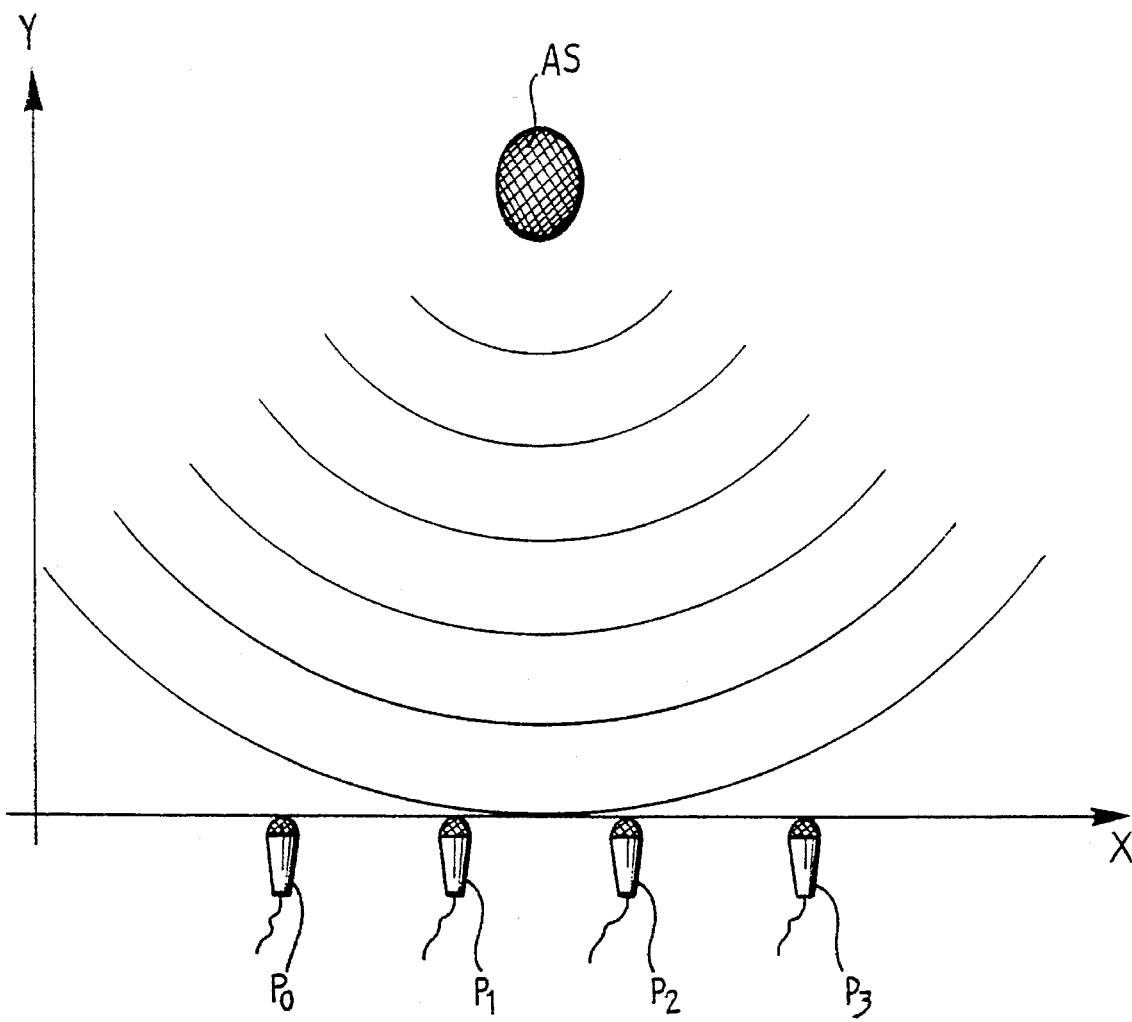
FIG. 1 shows schematically the operating conditions of the system according to the present invention.

The location operation of the acoustic source is performed in any time interval in which detection has provided a positive result (see FIG. 1).

At any moment t, the value $\delta_j(t)$ can be returned to the direction in which the wave front arrived, with respect to the centre of the pair of microphones (O, j): this direction can be expressed, in angular terms, as:

$$\Theta_j(t) = \arccos(v \delta_j(t)/d_j)$$

in which v is the speed of the sound and $d_j$ is the distance between the microphone $P_0$ and the microphone $P_j$. For any moment t, a direction $\Theta_j(t)$, corresponding to the delay $\delta_j(t)$, is associated with each pair of microphones (O, j).

This modeling is based on the assumption that the acoustic pressure wave has reached the array in the form of a flat wave. The assumption is no longer valid in the case in which the source is a short distance away from the array.

In this case, which is the one in which the embodiment described is used, the possible points which may give rise to the acoustic event in question plot a branch of a hyperbola which has its focus in the position of one of the two microphones. The use of four microphones, and thus of three pairs, enables three branches of a hyperbola to be determined, the intersections of which delimit the area inside which the source should be located.

The following procedure is used to calculate the intersection between two branches of a hyperbola, for example, corresponding to the pairs (0, 1) and (0, 2).

With the co-ordinates of the microphones 0, 1, 2 being set as $p_0$, $p_1$, $p_2$, along the axis of the array and the delays estimated by each pair being indicated as $\delta_{01}$ and $\delta_{02}$, the co-ordinates of the point of intersection are given as:

$$X_{p12} = \left[ \frac{\delta_{02}(P_0^2 - P_1^2) - \delta_{01}(P_0^2 - P_2^2) + v^2\delta_{01}\delta_{02}(\delta_{01} - \delta_{02})}{2[\delta_{02}(P_0 - P_1) - \delta_{01}(P_0 - P_2)]} \right]$$

$$Y_{p12} = \left[ \left( \frac{P_1^2 - P_0^2 + 2xP_1 - 2xP_2 - Y^2\delta_{01}^2}{2Y_{01}^6} \right)^2 - (x - P_0)^2 \right]^{1/2}$$

The co-ordinates $x_{p13}$, $y_{p13}$, $x_{p23}$, $y_{23}$ of the points of intersection between the other two pairs of branches of a hyperbola are determined in a similar manner.

The co-ordinates (x, y) of the acoustic source are derived from these three points, as the barycentre of the triangle of which they form the vertices.

Module RIC: Reconstruction

The reconstruction of the signals on the basis of the signals $s_0(t)$, $s_1(t)$, $s_2(t)$, $s_3(t)$ and of the delays $\delta_1(t)$, $\delta_2(t)$, $\delta_3(t)$, respectively between the pairs of signals (0, 1), (0, 2), (0, 3) is based on a modeling of the desired signal, of the following type:

Using this modeling, the array can be "directed" at any moment towards the position determined from the given delays.

It will be appreciated that, as the principle of the invention remains the same, the details of construction and forms of embodiment may vary widely with respect to those described and illustrated, without thereby departing from the scope of the present invention.

What is claimed is:

1. A method for the acquisition and processing of acoustic signals inherent in an acoustic event manifested in a given spatial region, the method comprising the operations of:

acquiring the said acoustic signals at a plurality of different points in the said spatial region, generating from the said acoustic signals first signals indicative of cross-spectra for a plurality of pairs of the said acoustic signals, extracting phase information present in the said cross-spectra for the purposes of acquisition and/or processing, and locating at any moment the said acoustic event on the basis of delays calculated on the basis of the estimation of signals obtained by antitransformation of the said first signals.

2. A method according to claim 1, including the operation of reconstructing the said acoustic event using the said acoustic signals in conjunction with delays calculated on the basis of the estimation of the said first signals.

3. A method according to claim 2, including basing the said reconstruction of the acoustic event on a modeling of the acoustic signal to be reconstructed substantially according to the formula:

$$s(t) = a_0 s_0(t) + a_1 s_1(t+\delta_1(t)) + a_2 s_2(t+\delta_2(t)) + a_3 s_3(t+\delta_3(t))$$

in which s(t) is the said acoustic signal to be reconstructed, $s_0(t)$, $s_0(t)$, $s_1(t)$, $s_2(t)$, $s_3(t)$ are the said acoustic signals $\delta_1(t)$, $\delta_2(t)$, $\delta_3(t)$ are the said delays, and $a_0$, $a_1$, $a_2$, $a_3$ are numerical coefficients.

4. A method according to claim 1, wherein the said acoustic signals are converted into digital format after measurement.

5. A method according to claim 4, wherein the said conversion into digital format occurs at a given sampling frequency which is higher than a frequency band of the said acoustic event.

6. A method according to claim 1, wherein the operation for generating the said first signals on the basis of the said acoustic signals comprises the phases of:

extracting sampling frames from the said acoustic signals, calculating an integral transform from the said frames, calculating cross power spectra for a plurality of pairs of the integral transform of the said frames, calculating an antitransform of the said cross power spectra.

7. A method according to claim 6, wherein the phase for extracting the frames comprises the phases of:

extracting frames having predetermined lengths $t_f$, corresponding to a predetermined number N of samples, with a pitch $t_a$, weighting the said frames by means of a window.

8. A method according to claim 7, wherein the said window is a Blackman window.

9. A method according to claim 6, wherein when a sampling frequency $F_c = 48$ kHz, N is selected such that it is of the order of 1024 and $t_f$ is of the order of 21.33 ms and $t_a$ is of the order of $t_f/2 = 10.66$ ms.

10. A method according to claim 6, wherein the integral transform of the frames is a Fourier transform.

11. A method according to claim 10, characterized in that the Fourier transform is a fast Fourier transform or FFT.

12. A method according to claim 6, wherein the said cross power spectra are normalised cross power spectra.

13. A method according to claim 5, wherein the phase of calculating the cross power spectra comprises:

the phase of calculating for each of said pairs of the transform a vector $\vec{\rho}_j$ having n components substantially in accordance with the formula $$\vec{\rho}_j = FFT^{-1}[\vec{Y}_j]$$

when j = 1, 2, 3, the pairs being $X_0, X_1$; $X_0, X_2$; $X_0, X_3$; and the l-th complex generic component of the vector $Y_j$ being defined as:

$$\vec{Y}_j(1) = \left[ \frac{X_0(1) X_j^*(1)}{|X_0(1)||X_j^*(1)|} \right]$$

in which $X_j^*$ is the conjugate complex vector of the vector $X_j$.

14. A method according to claim 13, characterized in that the components of the vector $\vec{\rho}_j$ are normalised.

15. A method according to claim 1, wherein the operation for generating the said first signals on the basis of the said acoustic signals comprises the phases of:

extracting sampling frames from the said acoustic signals, calculating an integral transform from the said frames, calculating cross power spectra for a plurality of pairs of the integral transform of the said frames, calculating an antitransform of the said cross power spectra, wherein the phase of calculating the cross power spectra comprises:

the phase of calculating for each of the pairs a vector $\vec{p}_j$ having n components substantially in accordance with the formula $$\vec{p}_j = FFT^{-1}\{\vec{Y}_j\}$$

when j=1, 2, 3, the pairs being $X_0, X_1; X_0, X_2; X_0, X_3$; and the l-th complex generic component of the vector $Y_j$ being defined as:

$$Y'_j(l) = \left[\frac{X_0(l) X_j^*(l)}{|X_0(l)||X_j^*(l)|}\right]$$

in which $X_j^*$ is the conjugate complex vector of the vector $X_j$, and
wherein the method includes the phase of estimating the relative delay between pairs of frames of signals which comprises the phase of using the vector $\vec{p}_j$ to calculate an index of coherence between the frame $x_0$ and a frame obtained by disphasing the frame $x_j$ by a number of samples i corresponding to a delay $\tau_i = i/F_c$, equivalent to an index of coherence between the acoustic signal $S_0$ and the acoustic signal $S_j$ disphased by a delay $\tau_i$.

16. A method according to claim 12, wherein the first signals comprise coherence functions $C_j$ (t, $\tau$) consisting of the vectors $\vec{p}_j$ respectively.

17. A method according to claim 6, wherein the sample frames are extracted in pairs each comprising a first frame present in each pair, and a second frame selected from the frames which are different from the first frame common to all the pairs such that there is one pair for each of the frames different from the said first frame.

18. A method according to claim 6, wherein the said antitransform is an inverse Fourier transform.

19. A method according to claim 18, wherein the said inverse Fourier transform is an inverse fast Fourier transform or FFT.

20. A method according to claim 1, wherein the said first signals are estimated by means of filtering and interpolation.

21. A method according to claim 20, wherein the filtering of said first signals is activated by the use of at least one finite impulse response filter or FIR.

22. A method according to claim 1, wherein the said first signals are submitted to an operation for the search of the maximum of the first signals to generate second signals.

23. A method according to claim 12, wherein the first signals comprise coherence functions $C_j$ (t, $\tau$) consisting of the vectors $\vec{p}_j$ respectively, wherein the said first signals are submitted to an operation for the search of the maximum of the first signals to generate second signals, and wherein the phase of searching for the maximum comprises the phases of:

searching for the maximum of the said coherence functions, filtrated and interpolated, $C_j'$ (t, $\tau$) when a delay $\tau'$ is varied, generating functions $M_j(t)$ defined substantially according to the formula $$M_j(t) = \max C_j'(t, \tau') \ \tau'$$

when t is varied, and
calculating the delays ($\delta_1, \delta_2, \delta_3$) as delays $\delta_j(t) = \tau'_{max}$ corresponding to the functions $M_j(t)$.

24. A method according to claim 1, wherein the phase of detecting the said acoustic event comprises the phases of:

generating a detection signal on the basis of the said second signals, detecting that the detection signal has passed a predetermined threshold.

25. A method according to claim 12, wherein the first signals comprise coherence functions $C_j$ (t, $\tau$) consisting of the vectors $\vec{p}_j$ respectively, the said first signals are submitted to an operation for the search of the maximum of the first signals to generate second signals, wherein the phase of searching for the maximum comprises the phases of:

searching for the maximum of the coherence functions, filtrated and interpolated, $C_j'(t, \tau')$ when a delay $\tau'$ is varied, generating functions $M_j(t)$ defined substantially according to the formula $$M_j(t) = \max_{\tau'} C_j'(t, \tau')$$

when t is varied, and
calculating the delays ($\delta_1, \delta_2, \delta_3$) as delays $\delta_j(t) = \tau'_{max}$ corresponding to the functions $M_j(t)$,
wherein the phase of detecting the said acoustic event comprises the phases of:

generating a detection signal on the basis of the said second signals, detecting that the detection signal has passed a predetermined threshold, and
wherein the said detection signal is substantially generated according to the formula $$d(t) = max[M_1(t), M_2(t), M_3(t)]$$

in which d(t) is the said detection signal.

26. A method according to claim 1, wherein the method comprises the operation of locating at any moment the said acoustic event on the basis of delays calculated on the basis of the estimation of signals obtained by antitransformation of the said first signals,
wherein the operation for generating the said first signals on the basis of the said acoustic signals comprises the phases of:

extracting sampling frames from the said acoustic signals, calculating an integral transform from the said frames, calculating an antitransform of the said cross power spectra, and wherein the operation for locating the said acoustic event comprises the phases of:

calculating a branch of a hyperbola having its focus at one of the two detection points, for any pair of detection points corresponding to the pairs of frames, calculating an area, defined by the said branches of a hyperbola, inside which the acoustic event is located.

27. A method according to claim 1, wherein the operation of generating said first signals on the basis of said acoustic signals comprises the phases of:

calculating an integral transform from the said acoustic signals, and calculating cross power spectra for a plurality of pairs of the integral transform, wherein the said cross power spectra are normalized cross power spectra.

28. A system for the acquisition and processing of acoustic signals inherent in an acoustic event manifested in a given spatial region, comprising:

means for acquiring the said acoustic signals at a plurality of different points in the said spatial region, means for generating from the said acoustic signals first signals indicative of cross-spectra for a plurality of pairs of the said acoustic signals, means for extracting phase information present in the said cross-spectra, including:

means for locating at any moment the said acoustic event on the basis of delays calculated on the basis of delays calculated on the basis of the estimation of signals obtained by antitransformation of the said first signals.

* * * * *